July 4, 1972   J. DELAFOSSE ET AL   3,674,637
SPACER GRID FOR NUCLEAR REACTOR FUEL ELEMENT ASSEMBLY
Filed June 20, 1969   3 Sheets-Sheet 1

3,674,637
SPACER GRID FOR NUCLEAR REACTOR FUEL ELEMENT ASSEMBLY

Jacques Delafosse, Gif-sur-Yvette, and Jean-Luc Viaud, Bures-sur-Yvette, France, assignors to Commissariat a l'Energie Atomique, Paris, France
Filed June 20, 1969, Ser. No. 835,117
Claims priority, application France, July 2, 1968, 157,536
Int. Cl. G21c 3/34
U.S. Cl. 176—78                                          4 Claims

ABSTRACT OF THE DISCLOSURE

The invention concerns a spacer grid which maintains each rod of a nuclear reactor fuel elements assembly in a relatively large number of points and has however a low resistance to coolant flow.

This grid is formed by interassembled cut-out sheet metal members, each comprising two parallel rectilinear ribbon elements which delimits with narrow corrugated strips quadrangular openings, one of said ribbon being interrupted by a slot along the center line of each opening to permit insertion of another member.

---

The present invention is concerned with a spacer grid for a nuclear reactor fuel element assembly and particularly an assembly comprising a bundle of rods formed of fissile or fertile material, said rods being supported at each end by a grid and maintained at uniform intervals by means of other grids or braces, the intended function of said grids and braces being to ensure uniform spacing between said fuel rods and to prevent deformation of these latter.

A large number of different designs of spacer grids have been employed up to the present time. However, in some designs, the number of points of contact between the spacer grid and each fuel rod is too small to absorb the vibrations and deformations of said rods in an effective manner. In other designs, the grid takes up substantial space and causes high pressure drops in the flow of coolant around the fuel rods. Thus gives rise to local overheating which is incompatible with good performance of the fuel assemblies and can even lead to ultimate destruction of the fuel rods.

The aim of this invention is to circumvent the disadvantages referred to above by providing a spacer grid which has a sufficiently large number of points of contact with the fuel rods as well as low resistance to coolant flow.

This invention is in fact directed to a spacer grid for a fuel element assembly in which a bundle of rods formed of fissile or fertile material is braced by spacer grids each comprising within a frame a lattice of interassembled sheet metal members which define compartments having a square section, said spacer grid being characterized in that it is made up of cut-out sheet metal members each comprising two parallel rectilinear ribbon elements, narrow corrugated strips forming a number of projections on each side of the sheet metal member and defining openings between the ribbon elements, and slits forming interruptions in one of the ribbon elements in the center-line of each opening so as to permit the insertion of the continuous ribbon element of another sheet metal member, all said sheet metal members being attached at the extremities thereof to similar sheet metal members which form the sides of the outer frame.

Each fuel rod is thus maintained in four different directions uniformly distributed around its periphery and at a number of points located at different heights along its length, that is to say at a relatively large number of points.

Moreover, since the corrugated strips which are in contact with the fuel rods are of small width whilst the openings between said strips are of substantial size, there is practically a free circulation of coolant around the fuel rods and effective cooling is thus ensured. The cut-out design of the sheet metal members also makes it possible to endow the spacer grid as a whole with a sufficient degree of elasticity in all directions to absorb vibrations and accommodate relative expansions.

Said sheet metal members are fabricated by punching, die-stamping and bending which are carried out successively and in continuous operation, thereby minimizing their cost price. Furthermore, the assembly operation is both simple and accurate. Fabrication can therefore be readily carried out on a large scale at low cost.

A number of other advantages and properties of the invention will in any case become apparent from the following description of one embodiment which is given by way of nonlimitative example and illustrated in the accompanying drawings, in which.

Figure 1:
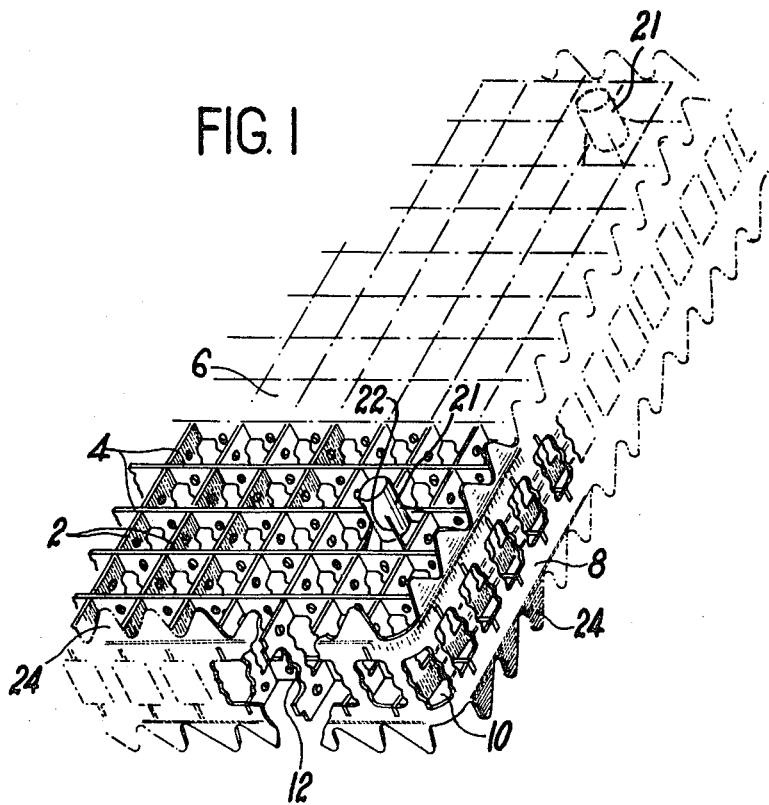
FIG. 1 shows diagrammatically and in perspective a fragmentary view of a spacer grid in accordance with the invention. However, only a part of said grid is visible in this figure since the entire grid is of similar construction.

The spacer grid which is intended to support the rods of fissile or fertile material of a nuclear reactor fuel assembly is constituted as shown in FIG. 1 by a square lattice of metallis strips 2, 4 disposed at right angles and defining compartments 6 which have a substantially square section. Said metallic strips 2, 4 are secured at each end within a frame 8 formed by four sheet metal members which are similar to the strips 2 and 4 and welded to each other. A rod 7 of fissile or fertile material can thus be placed in each compartment 6 in order to be braced by the compartment walls.

Figure 2:
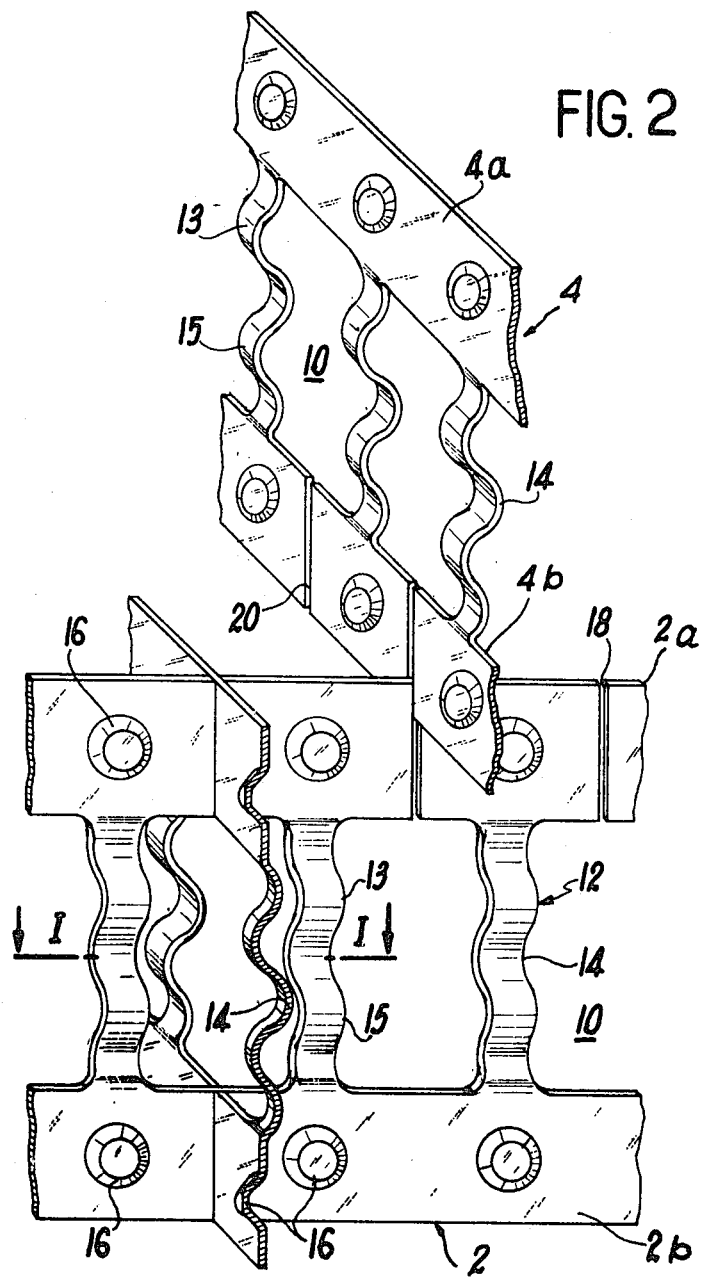
FIG. 2 is an exploded view on a larger scale showing the interassembly of cut-out sheet metal members which form the spacer grid of FIG. 1.

To this end, openings 10 of relatively large size with respect to the surface area of the sheet metal member itself are cut-out in the central portion of each member 2, 4. Said openings are all of equal size, uniformly spaced and separated by narrow strips 12 of corrugated or wavy shape which form in each by way of example in FIG. 2 three bosses 13, 14 and 15 between the two adjacent openings 10. The central boss 14 projects on one side of the sheet metal member whilst the bosses 13 and 15 project on the other side.

On each side of said corrugated strip 12, the top and bottom full portions of the sheet metal member 2 or 4 form two rectilinear ribbon elements 2a, 2b or 4a, 4b, each ribbon element being also provided with a boss 16 which is directed towards the same side as the bosses 13 and 15 but is of greater height.

Between said bosess 16 and in the center-line of each opening 10, the top ribbon element 2a is interrupted by a slit 18 whereas, in the case of the sheet metal members 4 which are perpendicular to the members 2, the ribbon element 4b is also interrupted by a slit 20 located at the bottom of each opening 10. The ribbon elements 2a and 4b are thus interrupted at uniform intervals. The members 2 and 4 can be interassembled by sliding them together, the walls of the slits 20 being thus placed on each side of the member 2 beneath the opening 10 whilst the top portion of the member 4 is maintained within the slit 18 of the member 2.

The sheet metal members which have thus been interassembled can readily be joined by electron beam welding, local brazing, resistance welding or any other suitable means in order that said members should be rigidly coupled together and that any relative displacement of these latter should thus be prevented.

Strictly accurate dimensions of the compartments are thus ensured without either complicated assembly or costly operations.

Each compartment 6 is limited on each of its four sides by a portion of sheet metal member, the central part of which is formed by a corrugated strip 12 whilst the corners of each compartment are cut away since they are formed by the junction of the full portions located between the slits 18 or 20 at the level of two openings 10.

Figure 3:
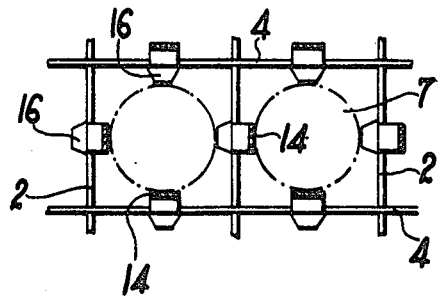
FIG. 3 is a sectional view on a smaller scale and taken along line I—I of FIG. 2.

As shown in FIG. 3, each fuel rod 7 is in contact on the one hand with the boss 14 of a sheet metal member 4 and the bosses 16 of the adjacent member 4 and on the other hand with the boss 14 of a sheet metal member 2 and the bosses 16 of the adjacent member 2. The fuel rod is thus maintained at points which are distributed along four uniformly spaced generator-lines and at several points of the height of said rod.

The flexibility imparted to the corrugated strip 12 by the bosses 13 and 15 serves to absorb deformations while permitting the liquid coolant to flow even between said contacting strip 12 and the fuel rod.

The sheet metal members 2 as well as the members 4 are each secured at one end to one side of the frame 8 which is also made up of cut-out sheet metal members in which the cut-out portions or openings 10 are limited by corrugated strips 12 of small width and ribbon elements in which are formed bosses 16.

However, the sheet metal members of the frame are provided with extensions both at the top and at the bottom in the form of teeth 24 which have the shape of rounded triangles and are slightly inclined toward the center of the spacer grid. These inclined teeth serve to guide each unitary fuel element when this latter is mounted within the reactor whilst the frame which is formed by the four toothed side members which are welded to each other rigidly maintains the members 2 and 4 at right angles to each other and endows the spacer grid as a whole with high strength.

Each sheet metal member 2 and 4 is fabricated in a series of operations such as punching, die-stamping and bending which are performed at low cost and which can readily be carried out in large-scale production. Each flexible corrugated strip or spring which is applied against the fuel rod has a degree of independence which facilitates constructional assembly and prevents deformations during fabrication. The cut-out sheet metal members which are thus obtained are then assembled by interengagement of the two members and accurate spot-welding by electron beam process, plasma-torch welding or the like, there being no need to carry out any operation for the purpose of correcting deformations.

The assembly is thus particularly simple and the spacer grid is inexpensive to produce.

For the purpose of guiding control rods, guide tubes 21 can be placed in a number of compartments 6 and secured in the corners of these latter by means of radial fins 22 (as shown in FIG. 1) which are either brazed, welded or secured to the sheet metal members by any suitable means.

Figure 4:
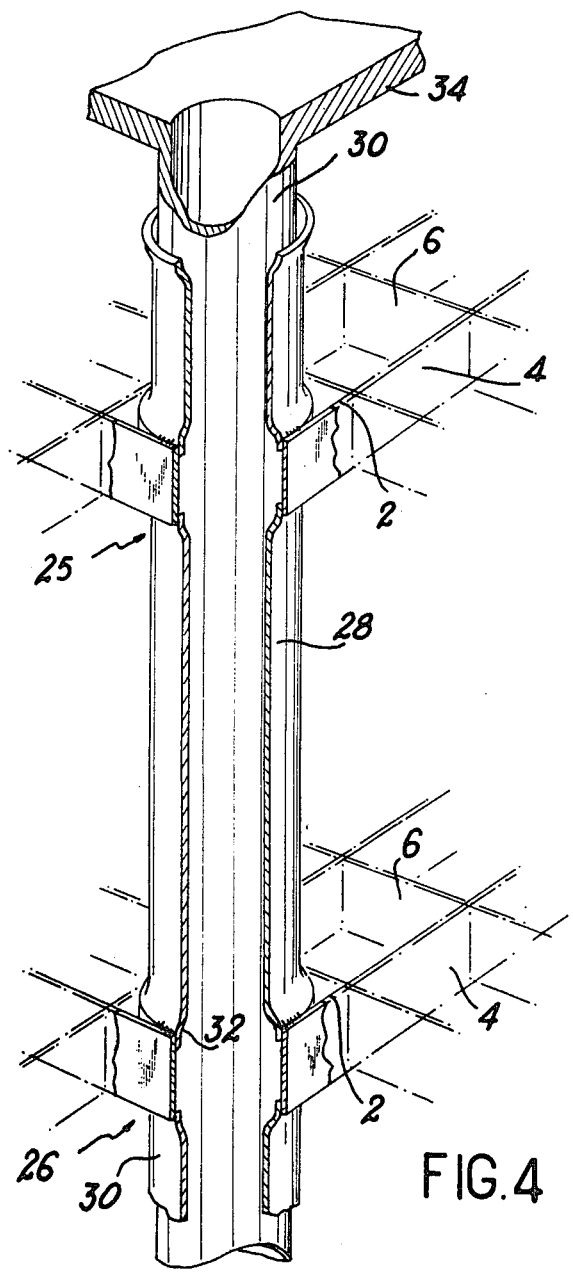
FIG. 4 is a partial and fragmentary diagrammatic view in perspective and on a larger scale showing the assembly of spacer grids on one fuel element.

In an alternative form of construction which is illustrated in FIG. 4, and in which the fuel element shown is braced by a plurality of spacer grids 25, 26, different compartments of each spacer grid are designed to support a spacer tube 28 which serves both as a tie between said grid and the adjacent grid and as a passageway for a control rod guide tube 30. Each extremity of said spacer tube 28 terminates in an end-fitting 32 which is secured to the sheet metal members 2 and 4 by welding, brazing or the like so that said members form a compartment 6 of the spacer grid externally of said end-fitting. The grids are thus supported at a predetermined distance and joined to each other as well as to the top and bottom support plates 34 of the fuel element assembly.

The sheet metal members may be fabricated, for example, from a nickel-iron-chromium alloy such as the alloy known as "Inconel 718," from stainless steel, from a zirconium alloy or from any like metal.

As is readily apparent, a number of different modifications could be made in the form of construction as hereinabove described and, for example, in the shape of the corrugations or waves of the narrow contacting strip without thereby departing either from the scope or the spirit of the invention.

What we claim is:

1. A spacer grid for a nuclear reactor fuel element assembly in which a bundle of rods of fissile or fertile material are mounted, comprising a frame, a lattice of interassembled sheet metal members in said frame which define compartments having a square section, said sheet metal members each comprising two parallel upper and lower rectilinear ribbon elements, narrow corrugated strips between said upper and lower ribbon elements having a number of projections on each side of said sheet metal members, generally rectangular openings defined by said ribbon element and by said strips, and slits in one of the ribbon elements in the center-line of each opening for insertion of the continuous ribbon element of another sheet metal member, all said sheet metal members being attached at the extremities thereof to similar sheet metal members which form the sides of the outer frame, each narrow strip having bottom and top bosses extending in the same direction and a corrugated portion forming at least one substantial projection in the direction opposite to that of said bosses.

2. A spacer grid in accordance with claim 1, said grid including guide tubes secured by radial fins in a number of compartments of said spacer grid.

3. A spacer grid in accordance with claim 1, said grid supporting spacer tubes secured to a number of compartments in coaxial relation therewith.

4. A nuclear reactor fuel element assembly comprising bundles of fuel rods supported by a plurality of spacer grids in accordance with claim 3, said spacer grids being secured to each other and to the top and bottom support plates of the fuel element assembly by spacer tubes.

References Cited

UNITED STATES PATENTS

| | | | |
|---|---|---|---|
| 3,137,638 | 6/1964 | Kumpf et al. | 176—78 |
| 3,317,399 | 5/1967 | Winders | 176—76 X |
| 3,350,275 | 10/1967 | Venier et al. | 176—78 |
| 3,366,546 | 1/1968 | Anthony et al. | 176—78 X |
| 3,377,254 | 4/1968 | Frisch | 176—78 |
| 3,379,617 | 4/1968 | Andrews et al. | 176—78 |
| 3,389,056 | 6/1968 | Frisch | 176—78 |
| 3,481,832 | 12/1969 | Rickert | 176—78 X |

CARL D. QUARFORTH, Primary Examiner

G. G. SOLYST, Assistant Examiner

U.S. Cl. X.R.

176—76